Oct. 25, 1949.  W. C. FOX  2,485,581
DOUBLE-WALLED PRESSURE COOKER
Filed Oct. 22, 1946  2 Sheets-Sheet 1

WILLIAM C. FOX, Inventor

By McMorrow, Berman & Davidson
Attorneys

Oct. 25, 1949.   W. C. FOX   2,485,581
DOUBLE-WALLED PRESSURE COOKER
Filed Oct. 22, 1946   2 Sheets-Sheet 2

WILLIAM C. FOX, Inventor

Patented Oct. 25, 1949

2,485,581

UNITED STATES PATENT OFFICE 2,485,581

DOUBLE WALLED PRESSURE COOKER

William C. Fox, Philadelphia, Pa.

Application October 22, 1946, Serial No. 704,848

3 Claims. (Cl. 126—376)

This invention relates to cooking vessels and more particularly to the construction of the same.

It is an object of the present invention to provide a cooking vessel of large capacity which will take up minimum space upon a heating surface and which is so formed that several of the vessels can be arranged side by side with little loss of contact with a heating surface.

It is another object of the present invention to provide a cooking vessel which is of sturdy construction and made of heavy material such that at times at the option of the user it can be used for pressure cooking and wherein the handles adapted to extend upwardly to withdraw the unit from between other vessels can be utilized when moved to a down position as a means for retaining the cover in place.

It is another object of the present invention to provide a cooking vessel with a double wall construction which is open at the bottom so that the hot air will pass upwardly through a confined space to the top of the vessel where it will exit through small openings therein.

It is still another object of the present invention to provide a cooking vessel wherein the cover and top structure is so formed that when pouring out the hot contents from the vessel there is little opportunity for the same to be deposited upon the attendant, wherein there is means for retaining the cover in a slightly open position while pouring out the liquid and wherein the pouring lip on one side is disposed downwardly from the top of the vessel and enclosed by three sides of the vessel.

For other objects and for a better understanding of the invention, reference may be had to the following details of description taken in connection with the accompanying drawings, in which.

Figure 1:
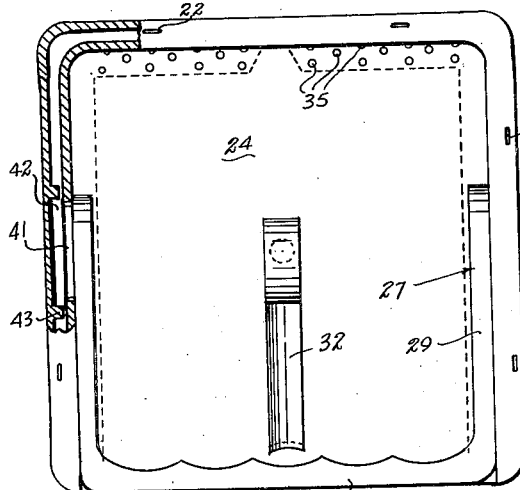
Figure 1 is a top plan view of the vessel showing the cover in place and with portions of the side of the vessel broken away to show the double wall construction and the means to which the side handles are connected to the side of the vessel.
Figures 3, 4:
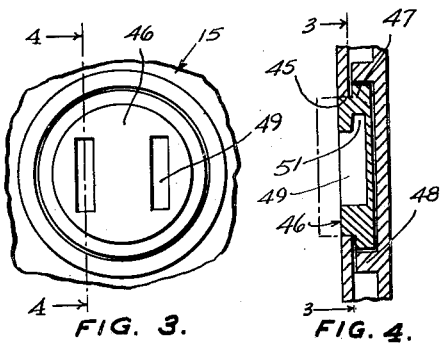
Figure 3 is a fragmentary view of one side of the vessel containing the rotatable element into which a handle is inserted for lifting the vessel from its position on a heating surface.
Figure 4 is a cross sectional view taken on line 4—4 of Figure 3, and looking in the direction of the arrows thereof.
Figure 2:
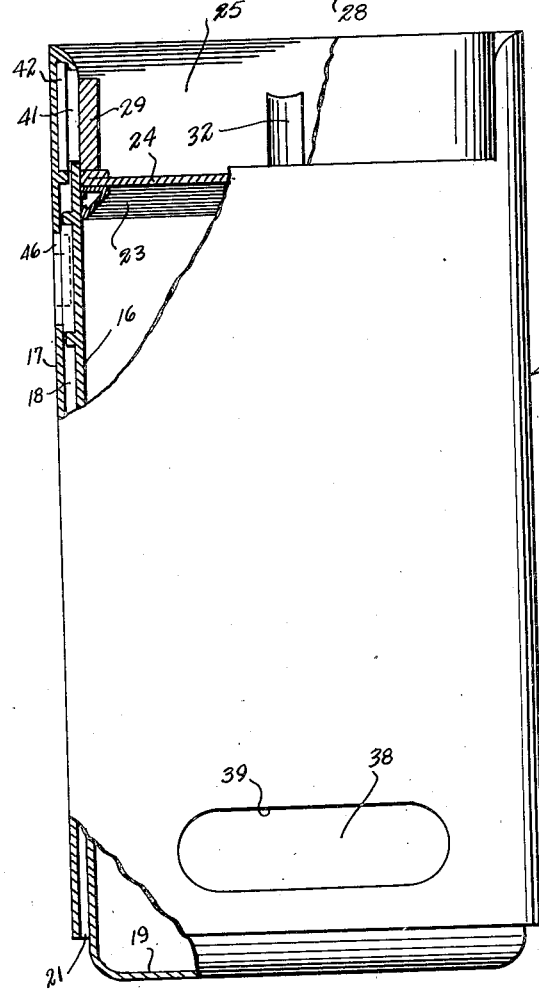
Figure 2 is a side elevational view with portions broken away to show the position of the cover on its seat, the device to which the side handles are connected to the side of the vessel, and the double wall construction as presented at both the top and bottom parts of the vessel.
Figures 5, 6:
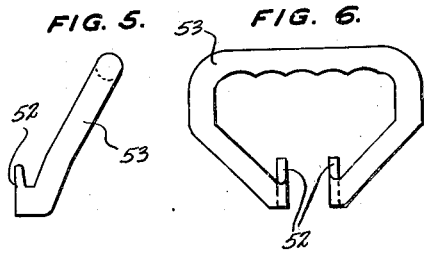
Figures 5 and 6 are respectively side and front elevational views of the detachable handle.

Referring now to the figures, 15 represents a vessel of double wall construction formed by any known procedure as by laying the same out on sheet material, cutting the sheet material and folding the parts together into the desired relationship to provide the completed vessel or the same may be made by a casting operation from cast material. When the vessel has been so formed there is an inner wall 16 and an outer wall 17 at each of the four sides of the vessel with a vertically extending space 18 extending upwardly therebetween, the inner walls 16 together forming an inner bounding wall and the outer wall portions 17 similarly forming an outer bounding wall for the vessel. The sides of the vessel are square so that they will consume little space when disposed together upon a heating surface. At this time the vessels can lie together in flush side to side engagement with one another. The outer wall 17 continues downwardly to a point slightly removed from a bottom face 19 of the vessel. At this location an opening 21 is provided through which heated air is directed for passage upwardly through the space 18. To maintain this circulation of air and whereby to get a maximum heating effect therefrom to heat the inner wall 16 there is provided at the top of the vessel small openings 22, there being at least two such openings at each side of the vessel.

To the interior of the inner wall at a location removed from the top of the vessel there is disposed an inwardly extending seat 23 for supporting a cover 24. This seat has a top flat surface adapted to be engaged by the outer periphery of the cover 24. While three of the sides of the vessel extend upwardly to the full height thereof, the fourth side extends upwardly only to the top of the cover seat. At the side of the vessel which is only the height of the valve seat there is thus provided an opening or cut-out portion as indicated at 25 through which the cover can be extended or removed and through which the solid contents as well as the liquid contents may be dispensed. The portions of the other sides of the vessel extending upwardly above the fourth side thus provide a shield about the opening 25 to prevent the contents when being poured out of the vessel from being slopped upon the attendant.

Figure 7:
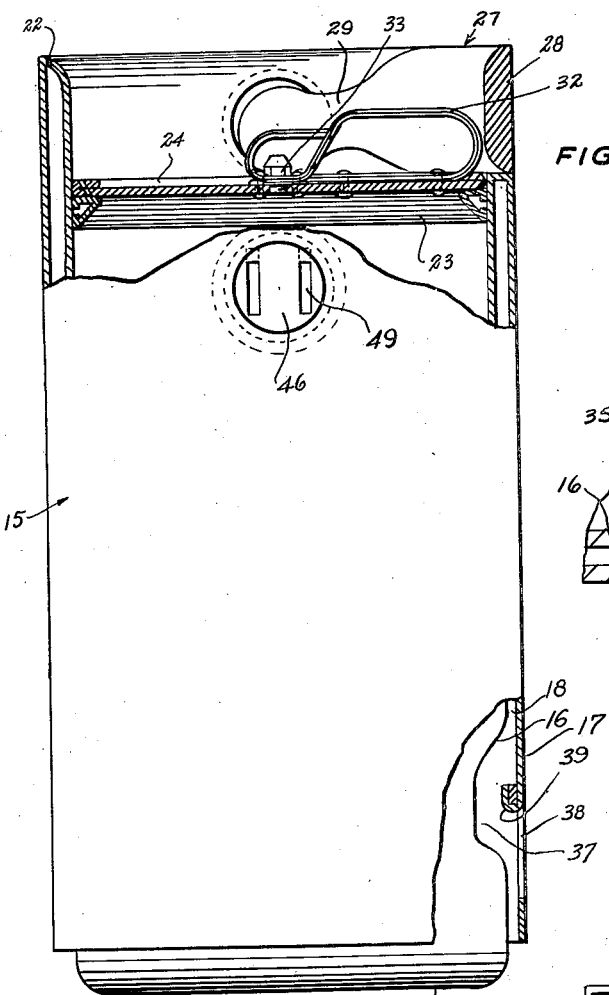
Figure 7 is a side elevational view looking upon the side thereof having the means to which the handle is attached with the top part broken away and with the handle for the cover and for the top of the vessel turned down to be out of the way, and with the bottom of the vessel broken away to show the hand-hold disposed in the exterior wall near the bottom of the vessel.

At times when the cover is to be fixed in place upon the seat 23, a top handle 27 having a hand grasping portion 28 is pivoted over so that the hand grasping portion 28 is in vertical alignment with the fourth side of the vessel. Upon arms 29 of the handle 27 there is provided an eccentric engaging face 31 adapted to contact with the top face of the cover and to bring the same tightly upon its seat when the handle 27 has been pivoted to the position shown in Figure 7. At other times when the handle is pivoted to an upright position to serve as a means by which the vessel can be withdrawn upwardly from a heating surface the eccentric surface 31 on its arms will release the cover so as to permit the same to be withdrawn outwardly through the opening 25 by means of a handle 32 fastened to the top of the cover by a pressure release valve 33. This release valve is effective particularly at times when the cover is fixed upon its seat to effect a pressure cooking operation.

Figure 8:
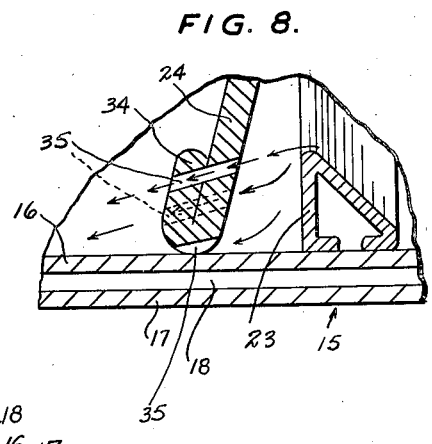
Figure 8 is an enlarged fragmentary cross sectional view taken near one edge of the cover with the cover having been displaced from its seat and retained within the vessel as at times when it is desired to remove liquid from the same without removing the solid contents.
Figure 9:
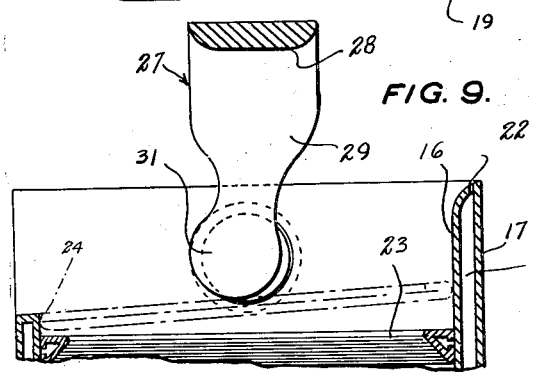
Figure 9 is a fragmentary view of the top of the vessel when the top handle has been pivoted upwardly to withdraw the vessel from its heating surface and to detach the cover so that the contents can be removed therefrom.
Figure 10:
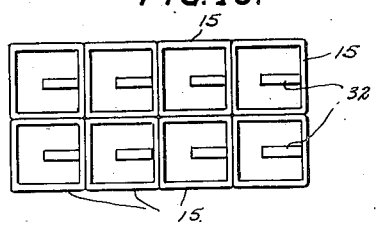
Figure 10 is an assembly view of several vessels as grouped together upon the heating surface.

At times when it is desired only to remove the liquid contents of the vessel, the handle 27 is released and brought upwardly and the pouring is effected from the opposite side of the vessel from the opening 25 in the manner illustrated in Figure 8. The cover 24 has a double thickness peripheral portion 34 through which there is extended a series of openings 35. With the vessel in the position as illustrated in Figure 8 to effect a pouring of the liquid, the openings 35 through which the liquid will pass are inclined forwardly and downwardly away from the attendant who is at that time effecting pouring of the liquid. With the openings so arranged there is less opportunity that the attendant would be scalded by the liquid.

In order to provide a hand hold by which the pouring of the vessel can be effected, the inner wall 16 is provided with a depression 37 into which the fingers can be extended when directed through a hole 38 in the lower end of the outer wall 17. The upper part of the hole wall is formed from a bent up portion 39 to provide a smooth edge with which the fingers can engage at this time.

The connection of the arms 29 of the handle 27 is effected by the provision of flanged extensions 41 on the outer sides thereof arranged so that its flange 42 lies in the space 18 between the walls and within a journal bearing 43 secured to the interior of the outer wall 17, Figure 1.

In order to provide other handle devices for the vessel there is disposed within opposite side walls of the vessel in the manner similar to that just described in connection of the handle arm portions 29 to the side walls of the vessel through openings in the inner wall 16 thereof. In the present instance there is disposed through an opening 45 in the outer wall 17, a disc 46 having a flange 47 adapted to lie in the space 18 between the inner and outer walls. This disc 46 is rotatable within the opening and its flange 47 is journaled in a portion 48 on the outer wall 17 and extended into the space 18. This disc 46 has two recesses 49 with an undercut portion 51 into which attaching portions 52 of a handle 53 are extending at times when side handles are desired for the vessel. By means of the disc 46 and the connection of the handles rigidly thereto a handle arrangement is provided such that there can be relative rotation of the handle arrangement with respect to the side of the vessel.

While various changes may be made in the detail construction it shall be understood that such changes shall be within the spirit and scope of the present invention as defined by the appended claims.

Having thus described the invention, I claim:

1. A cooking vessel comprising four sides and a bottom, each of said sides having inner and outer walls to provide a space adjacent to the inner wall of the sides so that heated air from the open bottom end of the space will be directed upwardly along the inner wall of each side to heat the same, each side further having an opening at the top to permit the continued passage of the air through the side and upwardly to the top thereof, three of said sides extending upwardly above the fourth side whereby space is provided above the fourth side through which the contents of the vessel can be poured and whereby at this time the extension of the other three sides will provide protection to the attendant, a cover seat provided on the inner wall of the four sides and a cover disposed upon the cover seat, said cover being withdrawable through the opening provided above the fourth side, and means carried by the inner wall of two of the extended sides for securing the cover in pressure tight relationship upon the seat.

2. A cooking vessel comprising four sides and a bottom, each of said sides having inner and outer walls to provide a space adjacent to the inner wall of the sides so that heated air from the open bottom end of the space will be directed upwardly along the inner wall of each side to heat the same, each side further having an opening at the top to permit the continued passage of the air through the side and upwardly to the top thereof, three of said sides extending upwardly above the fourth side whereby space is provided above the fourth side through which the contents of the vessel can be poured and whereby at this time the extension of the other three sides will provide protection to the attendant, a cover seat provided on the inner wall of the four sides, a cover disposed upon the cover seat, said cover being withdrawable through the opening provided above the fourth side, means carried by the inner wall of two of the extended sides for securing the cover in pressure tight relationship upon the seat, said cover having a handle for withdrawing the cover through the opening above the fourth side, a safety valve provided upon the cover and serving as means for the attachment of the handle to the cover.

3. A cooking vessel having an inner bounding wall defining an upper opening at the upper end of the vessel, an external bounding wall secured to and surrounding the inner bounding wall in spaced relation thereto, with the resulting space between the two bounding walls open at both top and bottom to allow heated air to be directed from the open bottom of said space upwardly along the inner bounding wall to heat said vessel, a cover seat formed upon the inner bounding wall, a cover removably disposed on the cover seat for closing the upper opening of the vessel, the bounding walls having an upwardly open cut-out portion disposed at one side of said bounding walls extending a limited distance down from the upper end of the remaining portions of said bounding walls and of sufficient width to allow withdrawal of said cover through said open cut-out portion, and the latter portion also serving as a pouring side through which the contents of the vessel may be poured while the greater height of the remaining sides of said bounding walls provide protection to the operator using the vessel, and means carried by the two opposite portions of the inner bounding wall above the level of the lower end of said cut-out portion for securing said cover in pressure-tight relationship upon said cover seat.

WILLIAM C. FOX.

REFERENCES CITED

The following references are of record in the file of this patent:

UNITED STATES PATENTS

| Number | Name | Date |
| --- | --- | --- |
| 306,637 | Ogborn | Oct. 14, 1884 |
| 517,673 | Tracy | Apr. 3, 1894 |
| 857,329 | Carey | June 18, 1907 |
| 945,659 | Wilson | Jan. 4, 1910 |
| 1,016,755 | Loweree | Feb. 6, 1912 |
| 1,058,146 | Burdin | Apr. 8, 1913 |
| 1,077,289 | Nash | Nov. 4, 1913 |
| 1,331,409 | Barnett | Feb. 17, 1920 |
| 2,176,400 | Hamblet | Oct. 17, 1939 |